United States Patent [19]
Cherdron et al.

[11] 3,949,047
[45] Apr. 6, 1976

[54] METHOD OF PRECIPITATING RADIUM TO YIELD HIGH PURITY CALCIUM SULFATE FROM PHOSPHATE ORES

[75] Inventors: Egon Cherdron, Limburgerhof, Pfalz; Hans-Joachim Förster, Schwetzingen; Istvan Potencsik, Mannheim, all of Germany

[73] Assignee: Gebr. Giulini GmbH, Ludwigshafen, Germany

[22] Filed: Apr. 12, 1973

[21] Appl. No.: 350,476

[30] Foreign Application Priority Data
Apr. 15, 1972 Germany............................ 2218382

[52] U.S. Cl. .................... 423/2; 423/166; 423/167; 423/309; 423/319; 423/555; 423/321 R
[51] Int. Cl. ....................... C01f 13/00; C01f 11/46
[58] Field of Search ........... 423/167, 321, 319, 264, 423/309, 308, 166, 2, 555

[56] References Cited
UNITED STATES PATENTS

| | | | |
|---|---|---|---|
| 1,154,231 | 9/1915 | Bredt | 423/2 |
| 1,487,205 | 3/1924 | Carothers et al. | 423/321 |
| 1,522,040 | 1/1925 | Thews | 423/2 |
| 1,554,056 | 9/1925 | Williams | 423/2 |
| 1,676,556 | 7/1928 | Howard | 423/308 |
| 2,531,977 | 11/1950 | Hammaren et al. | 423/166 |
| 2,883,266 | 4/1959 | Hodges et al. | 423/321 X |
| 2,889,217 | 6/1959 | Le Baron | 423/167 X |
| 2,894,804 | 7/1959 | Sawyer et al. | 423/2 |
| 2,926,992 | 3/1960 | Stedman | 423/18 |

OTHER PUBLICATIONS

Korkisch (I), *Modern Methods for the Separation of Rarer Metal Ions*, pp. 98–99, Pergamon Press, (1969) Oxford.
Korkisch (II), ibid, pp. 306 and 309.
Sneed et al., *Comprehensive Inorganic Chemistry*, Vol. 1, pp. 106–107, D. Van Nostrand Company, Inc. (1953), Princeton, N.J.

*Primary Examiner*—Benjamin R. Padgett
*Assistant Examiner*—E. A. Miller
*Attorney, Agent, or Firm*—Spencer & Kaye

[57] ABSTRACT

In the manufacture of phosphoric acid by treatment of phosphate ores with excess phosphoric acid and precipitation of calcium ions as calcium sulfate, the purity and quality of the byproduct calcium sulfate is substantially improved by subjecting the monocalcium phosphate extract of the ore before precipitation of calcium sulfate to one or more preliminary treatments, whereby contaminent ions are substantially and preferentially removed from the extract while the calcium remains substantially in solution. These preliminary treatments may include separation of fluoride by reaction with silicon compounds, separation of radium by reaction with barium compounds in the presence of sulfate ions, and separation of strontium as strontium sulfate.

17 Claims, No Drawings

METHOD OF PRECIPITATING RADIUM TO YIELD HIGH PURITY CALCIUM SULFATE FROM PHOSPHATE ORES

BACKGROUND OF THE INVENTION

In the production of phosphoric acid industrially by the so called "wet method", phosphate rock, such as the apatites and other phosphate ores, is often treated with excess phosphoric acid, whereby a monocalcium phosphate/phosphoric acid medium results. The phosphate/phosphoric acid slurry is further treated with sulfuric acid in accord with these general chemical reaction:

$$3CaH_4(PO_4)_2 + 3H_2SO_4 = 3CaSO_4 + 6H_3PO_4$$

The thus-separated calcium sulfate, which may be recovered as the dihydrate, hemihydrate or the anhydrite, is contaminated with most of the impurities originally present in the ore, such as organic compounds, fluorides, silicofluorides, strontium sulfate, radium sulfate, some insoluble phosphates, compounds of the rare earths and others. For industrial processing of these heavily contaminated gypsums to produce marketable products, such as the hemihydrate for the construction industry, extensive purification operations are necessary, such as washing and elutriation processes (German Pat. No. 1,471,177) as well as converting calcium sulfate dihydrate to hemihydrate, such as the hydrothermal process described in German Pat. No. 1,157,128.

However, even after such cleansing processes, certain contaminants remain which adversely affect the quality of the hemihydrate end product, thereby limiting its utility and consequent market demand. A typical hemihydrate gypsum after such purification treatment contains, among others, the following contaminants:

| | |
|---|---|
| fluorine | 0.3 – 0.8% |
| strontium | 1 – 1.5% |
| radium | 2 – 17 pCi |

Fluorides tend to delay the setting time of hemihydrate gypsums under certain conditions, which is especially undesirable where the hemihydrate is used in plaster for building purposes. Where the hemihydrate is used as an additive during the grinding of cement, a fluoride content is also disadvantageous because it likewise interferes with the setting of the cement. The presence of strontium in the hemihydrate adversely affects the strength of finished gypsum articles, according to Gordashevskij (Stroitelnye Materialy 6, 1960, No. 12, pages 32–34). Radium imparts a slight radioactivity to the gypsum which may be dangerous, or at least objectionable, even in the minute levels involved, in construction items made wholely or partially of plaster (see Hamilton, American Industrial Hygiene Association Journal, June, 1971, page 402).

Consequently, the calcium sulfate byproduct from industrial wet phosphoric acid processes has been substantially a waste material to be disposed of with minimum effort and expense.

SUMMARY OF THE INVENTION

This invention is directed to the problem of decomposing raw phosphate ores by the wet method without substantial contamination of the byproduct calcium sulfate and the removal of damaging fluorides, strontium salts and the radium impurities in a simple and economically acceptable procedure.

It is an object of the present invention to produce substantially pure calcium sulfate as a dihydrate, hemihydrate or anhydrite in connection with the production of phosphoric acid by digestion of raw phosphate ore with excess phosphoric acid and subsequent precipitation of calcium sulfate.

These and other objects will become apparent to those skilled in the art from the following disclosure and claims.

DETAILED DESCRIPTION OF THE PREFERRED EMBODIMENTS

The wet-process for producing phosphoric acid is well known. Such a process for example is described in U.S. Pat. No. 2,897,053. The AS 1,301,998 (Deutsche Auslegeschrift) described also the reaction of ground phosphate rock with excess phosphoric acid, whereby a phosphoric acid/monocalcium-phosphate solution results. The reaction is carried out in a reactor under stirring at a temperature above 95°C. The concentration of the phosphoric acid is at least 71% by weight. The resulting monocalciumphosphate/phosphoric medium can be treated with sulfuric acid producing phosphoric acid and calcium sulfate. The monocalcium-phosphate solution can also be treated with cation exchanger, whereby pure phosphoric acid results.

The U.S. Pat. No. 2,531,977 describes a process in which the phosphoric acid is used for decomposition of raw phosphates. The reaction is carried out at temperatures of the order to 70° to 80°C and the calcium sulfate is precipitated with sulfuric acid. The purification of the invention can be applied for example to the process of the U.S. Pat. No. 2,531,977.

Such phosphoric acid methods for the wet decomposition of raw phosphate on an industrial operation usually include the addition of some sulfuric acid in the initial decomposition stage. The byproduct calcium sulfate is thereby precipitated as calcium sulfate in the dihydrate, hemihydrate or anhydrite form, dependent upon the conditions, includes all the insoluble impurities of the raw ore as well as the fluorine, strontium and radium compounds precipitated during the digestion. The recovery of calcium sulfate of industrialy acceptable purity from this contaminated precipitate is so extremely difficult and expensive, as explained above, that it is not commercially feasible.

Applicants have found, however, that if the contaminants contained in the digestion mass are precipitated and separated from the extract while the calcium from the ore is substantially retained in solution in the monocalcium phosphate/phosphoric acid extract portion, the calcium sulfate will be precipitated substantially free from contaminants such as fluorides and compounds of strontium and radium when the monocalcium phosphate in the extract is converted to phosphoric acid by reaction with sulfuric acid in the known manner.

The high-purity calcium sulfate thus recovered is acceptable as the hemihydrate in plaster of paris compositions for plastic walls and other articles. It is also acceptable for use in cement compositions for construction purposes. In addition, articles made from these compositions are free of objectionable radioactivity.

These prior precipitations to remove the damaging fluorine, radium and strontium ions from the decomposition extract in accordance with this invention may be carried out either successively in a series of process steps or jointly in a single process step, depending upon the contaminants and the amounts thereof in the particular ore being processed. Similarly, these precipitates containing the radium, strontium and fluoride contaminants may be separated from the extract in one or more steps as best suits the conditions of processing the raw phosphate. Thus, in treating Kola apatite, which does not contain any radium compounds, the fluoride and strontium contaminants may be removed in one step by adding at the same time the reagents for forming insoluble fluoride and strontium compounds, and then separating the mixed precipitates from the solution.

With some phosphate rocks it may be desirable to carry out the precipitation of one or more of the fluoride, strontium and radium contaminants before the insoluble residue has been separated from the phosphate-containing extract. Again, depending upon the nature and amounts of such contaminants, the precipitating reagents may be added to the digestion mash during or after the digestion. In either procedure, the impurity-containing precipitate will be removed with the insoluble residues of the ore in a single step.

In the instant invention, the raw phosphates are initially decomposed by means of excess phosphoric acid at temperatures of 80°–110°C, usually at temperatures between 90° and 100°C, the concentration of the phosphoric acid lying between 28 and 45 percent $P_2O_5$ by weight, following conventional procedures. However, this invention provides for removal of fluoride ions from the monocalcium phosphate solution before the precipitation of the calcium as calcium sulfate, by the addition of active silicic acid and sodium or potassium compounds which are soluble in the reaction medium. The active silicic acid as well as the sodium or potassium compounds should be present at least in the stoichiometrically required quantities to form the difficulty soluble silicofluorides. In this connection, the term "active silicic acid" should be understood to include silicon dioxide in the form which is capable of reacting under the given conditions with the fluorine ions, such as fine particle silicon dioxide or precipitated silicic acid. The amount of active silicic acid which is present in the crude phosphate ore, as well as the soluble sodium and potassium compounds therein, should be considered when calculating the stoichiometrically required quantities of such reagents. In respect of the more important raw phosphates, the quantitites of active silicic acid and sodium or potassium compounds advantageously added will usually fall within the ranges set out in the following table.

| Florida Pebble Raw Phosphate (per 100 g) | |
|---|---|
| active silicic acid | 1.7 – 2.5 g, (preferably 2.0 – 2.3 g) |
| $Na_2O$ or $K_2O$ | 2 – 4 g, (preferably about 3 g) |
| Kola Apatite and Morocco Raw Phosphate (per 100 g) | |
| active silicic acid | 0.9 – 2.0 g, (preferably about 1.5 g) |
| $Na_2O$ or $K_2O$ | 2 – 4 g, (preferably about 3 g) |

Note.
The alkali compound will be added in the form of a salt

For other crude phosphate rocks, the reagent amounts will differ from those in the above table, as their fluorine and active silicic acid content differs from those of the above ores.

The radium is also removed by precipitation before the calcium sulfate precipitation, and may be effected either concurrently with or after the precipitation of the silicofluorides by the addition to the decomposition liquor containing $SO_4$ ions barium compounds such as $BaCO_3$, $BaCl_2$, $Ba(NO_3)_2$, BaO and other barium salts which are soluble therein. The radium sulfate is thereby precipitated together with the resulting barium sulfate and this precipitate can be removed from the extracted monocalcium phosphate solution by filtration or other appropriate separation procedure. For the precipitation of radium there should be about 0.2 to 3%, preferably 0.8 to 2%, by weight $SO_3$ with respect to the amount of phosphoric acid used. The required $SO_4$ ions may be introduced into the monocalcium phosphate/phosphoric acid extract in the form of sulfuric acid or soluble sulfates. The added quantities of barium ions are about 0.1 – 5, preferably 0.2 – 1, percent by weight, based upon the amount of raw phosphate used.

The strontium ions are undesirable components of the acid extract fraction, particularly from Kola apatites, since gypsum contaminated with strontium produces inferior plaster. The strontium is removed according to this invention by precipitation with the aid of $SO_4$ ions either along with or after the precipitation of the silico-fluorides. The quantity of $SO_4$ ions required for 100 g raw phosphate lies between 1 and 3 g, preferably at about 2 g, that is, about 1 to 3% by weight and preferably about 2% by weight, based upon the phosphate ore being treated.

The separation of the precipitated contaminants and/or unsoluble residues from the phosphoric acid/monocalcium phosphate solution can be carried out at temperatures between 20° and 110°C, preferably however between 50° and 100°C. It can be effected by means of known filtration agents such as beds of sand, filtering carbon, gypsum and the like, or by means of decanters, centrifuges thickeners, pressure filters or other conventional separating equipment.

According to a preferred embodiment of the process, the precipitation of the contaminants is carried out together with the precipitation of a limited quantitty, such as 1 – 20%, preferably 5 – 12%, by weight, of the theoretically possible yield of calcium sulfate which is effected by the appropriate control of the $SO_4$ content in the precipitation solution. This calcium sulfate then serves as a filtering aid during the subsequent separation of the precipitated contaminants.

After this separation of the various contaminants, substantially pure calcium sulfate is precipitated from the purified calcium phosphate solution by addition thereto of sulfuric acid or sulfates in the known manner. By the usual control of the concentration and temperature conditions, the calcium sulfate may be precipitated as the dihydrate, the hemihydrate or the anhydrate, as desired.

The calcium sulfate so obtained from the monocalcium phosphate/phosphoric acid liquid phase contains only very slight amounts of fluoride and strontium and is practically free of radium and its decay products. Moreover, it does not contain any organic components, and is characterized by a high degree of whiteness. By reason of these favorable features it is especially adapted for further processing to qualitatively perfect plaster products which can be used in the gypsum industry or in the cement industry.

The following examples will even more clearly explain the present invention.

EXAMPLE 1

In an acid-resistant digestion vessel provided with stirring means 60 l phosphoric acid ($d = 1.36$ g/cm$^3$) recovered from preceding acid decomposition processes and having an $SO_3$ concentration of 0.75% by weight $SO_3$ as well as 0.35 kg concentrated sulfuric acid ($SO_3$ concentration 1.1% by weight $SO_3$) and 6 kg unground raw pebble phosphate as well as 120 g fine particle $SiO_2$, 280 g anhydride $Na_2SO_4$ and 18 g $BaCO_3$ are added per hour in an uninterrupted stream, the temperatures being kept at 95°C. The mash is continuously brought over a pressure filter and maintained at this temperature so that 1 kg dry residue is obtained per hour, which residue consists substantially of calcium sulfate and contains 7.6% by weight F as well as 91 pCi/g radium. 5.4 kg concentrated sulfuric acid per hour is then mixed with the filtrate at 55°C., by simultaneously feeding the filtrate and acid into a conical reaction vessel. In the resulting calcium sulfate/phosphoric acid slurry the gypsum deposits and from the overlaying phosphoric acid ($d = 1,4$ g/cm$^3$) 40 l/h are recyled to the digestion vessel for decomposition of raw phosphate ore therein; the remaining gypsum/phosphoric acid slurry is withdrawn from the conical reaction vessel and filtered with a filtrate yield of 19.8 l/h of phosphoric acid, of which 16 l/h is recycled to the digestion vessel for decomposition of raw phosphate ore therein. The remainder, approximately 3.8 l/h is withdrawn for further processing, such as conversion to phosphate salts for industrial purposes.

The precipitate is washed with about 4 l/h water and the wash water, containing some phosphoric acid is also recycled to the phosphate ore digestion zone. A yield of 8.1 kg dry weight calcium sulfate dihydrate per hour is obtained.

The product calcium sulfate dihydrate is colorless and in the form of coarse particles which contain less than 2 pCi/g radium (limit of detectability) and 0.12% fluorine, based upon the weight of the dry dihydrate product.

EXAMPLE 2

Under the conditions described in Example 1, 6 kilograms per hour of Morocco phosphate rock are decomposed in the digestion zone. Concurrently, 110 g active $SiO_2$, 275 g $Wa_2SO_4$ (anhydride) and 9 g $BaCO_3$ per hour are continuously fed to the digestion zone. The residue from the decomposition mixture after filtration to separate the phosphoric acid/monocalcium phosphate solution amounts to about 1.5 kg, dry weight, per hour and contains 8.2% F by weight and 96 pCi/g radium. The washed calcium sulfate dihydrate precipitate obtained after reaction with sulfuric acid of the monocalcium phosphate/phosphoric acid filtrate is coarsely crystalline and colorless. It contains 0.15% F by weight and less than 2 pCi/g radium (limit of detectability).

EXAMPLE 3

31 l phosphoric acid (d = 1.33 g/cm$^3$) produced in the preceding examples and having an $SO_3$ concentration of 0.8% by weight $SO_3$ are heated to 95°C and the $SO_3$ concentration is adjusted with $H_2SO_4$ to 1.1% by weight $SO_3$. Then at this temperature, 3 kg unground Kola raw phosphate ore and 48 g fine particle $SiO_2$ and 130 g $Na_2SO_4$ anhydride are added and allowed to react for 20 minutes.

The decomposition mass is then filtered, leaving a residue having a dry weight of 1.27 kg. The residue is chiefly calcium sulfate and strontium sulfate and contains substantially all the fluorine and rare earths which were present in the raw phosphate ore.

The filtrate and 2.7 kg concentrated sulfuric acid are fed together into a reaction vessel at 50°–60°C. Coarse, well developed calcium sulfate dihydrate crystals were precipitated, separated from the phosphoric acid and washed with water. The dihydrate product is colorless and contains 0.08% F, less than 0.01% rare earths and less than 0.1% strontium. The phosphoric acid filtrate has a density of 1.37 g/cm$^3$.

It will be understood that the above description of the present invention is susceptible to various modifications, changes and adaptations, and the same are intended to be comprehended within the meaning and range of equivalents of the appended claims.

We claim:

1. In the production of phosphoric acid by the digestion of calcium-containing phosphate ore with phosphoric acid thereby producing a mono-calcium phosphate/phosphoric acid solution and the mono-calcium phosphate in said solution is reacted with sulfuric acid with the formation of phosphoric acid and a precipitate of calcium sulfate, the improvement which comprises treating the mono-calcium phosphate-containing solution with at least one soluble barium compound in the presence of sulfate ions to precipitate therefrom contaminant radium ions which would otherwise be precipitated with said calcium sulfate, removing the resulting precipitate while retaining the mono-calcium phosphate in solution and thereafter adding sulfuric acid to the thus-purified solution to produce phosphoric acid and a precipitate of high-purity calcium sulfate.

2. Method as defined in claim 1, wherein active silicic acid and sodium and potassium compounds soluble in the mono-calcium phosphate-containing solution are added to the mono-calcium phosphate-containing solution to precipitate fluoride ions together with the radium precipitation, and the resulting precipitation products are separated together from the mono-calcium phosphate solution with the unsoluble residues from the phosphoric acid decomposition of the ore.

3. Method as defined in claim 2 wherein the phosphate ore is Florida pebble phosphate, the active silicic acid is used in the proportion of 1.7–2.5 g per 100 g ore, and 2–4 g of $Na_2O$ in the form of sodium sulfate or another sodium compound is used per 100 g ore.

4. Method as defined in claim 2, wherein the phosphate ore is Kola apatite, the active silicic acid is used in the proportion of 0.9–2.0 g per 100 kg of the ore, and 2–4 g of $Na_2O$ in the form of sodium sulfate or another sodium compound is used per 100 kg of the ore.

5. Method as defined in claim 2, wherein the ore is Morocco raw phosphate, the active silicic acid is used in proportions of 0.9–2.0 g per 100 g of the ore, and 2–4 g of $Na_2O$ in the form of sodium sulfate or another sodium compound is used per 100 g ore.

6. Method as defined in claim 1, wherein the barium compound is barium carbonate, barium chloride and barium nitrate or barium oxide.

7. Method as defined in claim 6 wherein the radium precipitation takes place in a reaction medium containing 0.2–3.0 % by weight $SO_3$ with respect to the phosphoric acid used in digesting the ore.

8. Method as defined in claim 7 wherein the radium precipitation takes place in a reaction medium containing 0.8 to 2.0% by weight $SO_3$ with respect to the phosphoric acid used in digesting the ore.

9. Method as defined in claim 1, wherein sufficient $SO_4$ compounds are provided in the phosphate solution so that 1–20% of the calcium contained in the phosphate solution is precipitated along with the contaminant radium ions being removed from said solution.

10. Method as defined in claim 1, wherein sufficient $SO_4$ compounds are provided in the phosphate solution so that 5 to 12% of the calcium contained in the phosphate solution is precipitated along with the contaminant radium ions being removed from said solution.

11. Method as defined in claim 2, wherein the phosphate ore is Florida pebble phosphate, the active silicic acid is used in the proportion of 2.0 to 2.3 g per 100 g ore, and about 3 g of $Na_2O$ in the form of sodium sulfate or another sodium compound is used per 100 g ore.

12. Method as defined in claim 11 wherein the radium precipitation takes place in a reaction medium containing 0.2–3.0% by weight $SO_3$ with respect to the phosphoric acid used in digesting the ore.

13. Method as defined in claim 2, wherein the phosphate ore is Kola apatite, the active silicic acid is used in the proportion of 1.5 g per 100 kg of the ore, and 3 g of $Na_2O$ in the form of sodium sulfate or another sodium compound is used per 100 kg of the ore.

14. Method as defined in claim 13 wherein the radium precipitation takes place in a reaction medium containing 0.2–3.0% by weight $SO_3$ with respect to the phosphoric acid used in digesting the ore.

15. Method as defined in claim 2, wherein the ore is Morocco raw phosphate, the active silicic acid is used in proportions of 1.5 g per 100 g of the ore, and 3 g of $Na_2O$ in the form of sodium sulfate or another sodium compound is used per 100 g ore.

16. Method as defined in claim 15 wherein the radium precipitation takes place in a reaction medium containing 0.2–3.0% by weight $SO_3$ with respect to the phosphoric acid used in digesting the ore.

17. Method as defined in claim 1 wherein the soluble barium compound is a barium salt.

* * * * *